US011756323B2

(12) United States Patent
Kang et al.

(10) Patent No.: US 11,756,323 B2
(45) Date of Patent: Sep. 12, 2023

(54) METHOD OF AUTOMATICALLY RECOGNIZING AND CLASSIFYING DESIGN INFORMATION IN IMAGED PID DRAWING AND METHOD OF AUTOMATICALLY CREATING INTELLIGENT PID DRAWING USING DESIGN INFORMATION STORED IN DATABASE

(71) Applicants: DOFTECH CO., LTD., Seoul (KR); POSTECH Research and Business Development Foundation, Pohang-si (KR)

(72) Inventors: Sung Oh Kang, Seoul (KR); Hum Kyung Baek, Seoul (KR); Eul Bum Lee, Pohang-si (KR)

(73) Assignees: DOFTECH CO., LTD., Seoul (KR); POSTECH Research and Business Development Foundation, Pohang-si (KR)

( * ) Notice: Subject to any disclaimer, the term of this patent is extended or adjusted under 35 U.S.C. 154(b) by 915 days.

(21) Appl. No.: 16/696,953

(22) Filed: Nov. 26, 2019

(65) Prior Publication Data
US 2020/0175211 A1   Jun. 4, 2020

(30) Foreign Application Priority Data

Nov. 30, 2018   (KR) .......................... 10-2018-0152246
Nov. 30, 2018   (KR) .......................... 10-2018-0152247

(51) Int. Cl.
*G06V 30/42*      (2022.01)
*G06V 30/422*     (2022.01)
(Continued)

(52) U.S. Cl.
CPC ............ *G06V 30/422* (2022.01); *G06F 30/12* (2020.01); *G06F 30/23* (2020.01); *G06V 30/153* (2022.01); *G06F 2111/12* (2020.01)

(58) Field of Classification Search
CPC ...... G06F 30/12; G06F 30/23; G06F 2111/12; G06V 30/153; G06V 30/10
(Continued)

(56) References Cited

U.S. PATENT DOCUMENTS

| 2009/0292514 A1* | 11/2009 | McKim | ................... C09B 9/00 |
| | | | 703/6 |
| 2018/0091671 A1* | 3/2018 | Takemura | ............ H04N 1/3877 |
| 2020/0175372 A1* | 6/2020 | Sharma | ................ G06N 3/0418 |

FOREIGN PATENT DOCUMENTS

| JP | 10-97619 A | * | 4/1998 |
| JP | 2001-092967 | | 4/2001 |

(Continued)

OTHER PUBLICATIONS

Moreno-Garcia_2018 (New trends on digitization of complex engineering drawings, Neural Computing and Applications (2019) (Year: 2019).*

*Primary Examiner* — Brian S Cook
(74) *Attorney, Agent, or Firm* — Morgan, Lewis & Bockius LLP

(57) ABSTRACT

An aspect of the present disclosure provides a method of recognizing and classifying design information by automatically digitizing an imaged P&ID drawing to digitize design information by totaling design elements with high accuracy within a short time, and another aspect of the present disclosure is to obtain an imaged P&ID drawing or a database stored in a text form as a digitized drawing by modeling a symbol, line, and text in an intelligent P&ID, thereby accurately and rapidly quoting a price and accu- (Continued)

rately checking compatibility between different design products.

24 Claims, 13 Drawing Sheets

(51) Int. Cl.
*G06F 30/12* (2020.01)
*G06F 30/23* (2020.01)
*G06V 30/148* (2022.01)
*G06F 111/12* (2020.01)

(58) Field of Classification Search
USPC .............................................................. 703/1
See application file for complete search history.

(56) References Cited

FOREIGN PATENT DOCUMENTS

| | | |
|---|---|---|
| JP | 2002-342384 | 11/2002 |
| KR | 10-2014-0112958 | 9/2014 |
| KR | 10-2018-0066340 | 6/2018 |

* cited by examiner

METHOD OF AUTOMATICALLY RECOGNIZING AND CLASSIFYING DESIGN INFORMATION IN IMAGED PID DRAWING AND METHOD OF AUTOMATICALLY CREATING INTELLIGENT PID DRAWING USING DESIGN INFORMATION STORED IN DATABASE

CROSS-REFERENCE TO RELATED APPLICATION

This application claims benefit of priority to Korean Patent Application Nos. 10-2018-0152246 filed on Nov. 30, 2018 and 10-2018-0152247 filed on Nov. 30, 2018 in the Korean Intellectual Property Office, each disclosure of which is incorporated herein by reference in its entirety.

BACKGROUND

1. Field

The present disclosure relates to a method of automatically recognizing and storing design information in an imaged piping and instrumentation diagram (P&ID), and more particularly, to a method of recognizing a symbol, line, and text of a P&ID drawing and classifying and storing the recognized design information in an associated manner. The present disclosure also relates to a method of automatically creating a drawing using design information stored in a database in a storage medium. Here, the database may include design information classified from an imaged P&ID or design information extracted through another intelligent P&ID. The present disclosure relates to a method of automatically creating a drawing using an intelligent P&ID.

2. Description of Related Art

Typically, engineering companies, oil companies, chemical companies, and the like hold design drawings in a CAD drawing format such as AutoCAD, PDF, or hard copy format. Recently, AI and big data technologies have been spreading due to the 4th industrial revolution, and in this situation, it is essential to digitize data held in PDF or hard copy formats to apply AI and big data technologies to the shipbuilding and plant engineering industry.

In addition, well-established oil and chemical companies manually create digitized drawings, while simultaneously checking retained design documents in hard copy and PDF formats to adopt the latest IT solutions.

Here, P&ID, which is an abbreviation of "Piping & Instrument Diagram", refers to a process flowchart in which equipment, piping, and electrical instrumentation of a certain process are clearly expressed in a diagram form, and design programs to create the P&ID includes SP P&ID (SmartPlant P&ID) of Intergraph Corporation, Aveva P&ID of Aveva Group plc, AutoCAD Plant P&ID of Autodesk, Inc., and the like.

To add, a digitization of the design drawing of the related art is merely utilized to check an error by comparing the digitized design drawings and imaged drawings with the naked eye, which involves a significant problem in utilizing data which is the most important information and which is required for automation of design or the like. In other words, it is difficult to check compatibility between design products and design information described on the imaged P&ID drawings is not created as a new drawing but omitted or whether there is erroneously written information, while comparing the imaged P&ID drawings and newly created drawings one by one.

Due to these problems, most enterprises have not actually been able to closely check results of calculation, which results in significantly low accuracy and reliability in material calculation. Errors in material supply calculation and mismatches in design information between products has caused many problems, such as delay in construction.

According to the related art method, demand for technologies supporting digitization of the existing drawing materials in an image format has increased and a related industry ripple effect is high. However, short-term profit creation is difficult, so the development of automatic drawing production technology is slow.

Since all the material items (including valves and the like) must be created while drafting new drawings, a lot of unnecessary time is required to create new drawings and fill in correct quantities. If a layout of piping is changed, it is very difficult to correct calculated materials and manage updates. In order to solve this problem, it is required to develop a method of automatically creating P&ID drawings using digitized design information generated from the imaged drawing data received from an ordering company.

SUMMARY

An aspect of the present disclosure is to automatically recognize and extract design information from an imaged P&ID drawing and accurately and rapidly digitize the extracted design information in digitizing equipment and symbols and calculating an estimate in the process of front-end engineering design, utilizing the automatically recognized design information in drafting a P&ID design drawing, accurately and rapidly calculating an estimate by obtaining a digitized drawing by automatically modeling a symbol, a line, and text in an intelligent P&ID through a database stored in a text form or the imaged P&ID drawing, and accurately checking compatibility between different design products.

Another aspect of the present disclosure provides a method of automatically generating a required P&ID drawing from digitized drawing design information from an existing ordering company. This shortens the time required to create a new drawing, filling in quantity, facilitating correction of an estimated material, and updating management thereof when a layout of piping or the like is changed.

According to a first embodiment of the present disclosure, a method of automatically recognizing and classifying design information in an imaged P&ID drawing includes: removing a line and text from the imaged P&ID drawing, subsequently extracting a symbol region, automatically registering a symbol, an origin of the symbol, and a connection point in the corresponding symbol region to a database; recognizing and extracting the pre-registered symbol from the imaged P&ID drawing in four directions and removing the extracted symbol from the imaged P&ID drawing; removing a trim line from the symbol-removed imaged P&ID drawing and recognizing and extracting a line using a sliding window method; calculating an aspect ratio in the symbol-removed imaged P&ID drawing to calculate a region in which text is present, and subsequently recognizing and extracting text in the corresponding region by an optical character reader (OCR); classifying text detected from a drawing region amongst the extracted texts into each attribute through a predefined attribute classification system; and associating an attribute value of the extracted symbol and line to a classified attribute at a distance most adjacent to the corresponding symbol and line in the text and associating on the basis of an equipment name recognized in the text in the case of equipment among the extracted symbols.

The method may further include: generating topology by re-arranging symbols in the flow mark order of lines after associating the extracted design information.

The extracted design information and topology may be generated as an intermediate file in a compatible XML format.

A symbol in which an additional symbol is registered is preferentially inspected, the equipment amongst symbols may first be inspected, and a nozzle may be searched and extracted from the periphery of an equipment region to increase recognition rate.

Feature points recognized in the symbol and a stored symbol may be compared, and the recognized symbols may be recognized as the stored symbol only when a conformity degree of the recognized symbol is higher than a set threshold.

In the step of recognizing and extracting the line, when the connection point and the line and a line and a line of the extracted symbol are connected but their coordinates are different, the line may be extracted by correcting the coordinates in units of pixels.

When the text is not recognized by the method of recognizing text, a corresponding text image may be stored and a character is mapped in the stored image to train an OCR to increase a recognition rate.

According to a second embodiment of the present disclosure, a method of automatically creating an intelligent P&ID using design information stored in a database includes: mapping the design information stored in the database to a predefined intelligent P&ID, converting the mapped information, and storing an associated relationship and information of converted data; combining primary process lines in a design target process to each other to connect a main line in modeling to a primary line configuring the design target process in the converted data after being mapped to the intelligent P&ID, additionally connecting a branch line branched from the main line, wherein the branch line is connected using a connector of the main line, which is a target, as association information; calculating a line and a connector to the symbol which is to be connected in the intelligent P&ID in which the primary line is modeled, and modeling a symbol connecting the symbol to the primary line; modeling a utility line by combining the same type utility lines which are connectable as a group in the symbol-modeled intelligent P&ID drawing; and modeling the primary line and the utility line by associating attribute information of a line number present at the nearest position using coordinate information stored in the database in the utility line-modeled intelligent P&ID.

In the converting and storing of the database, the database may include the design information automatically recognized and classified in the imaged P&ID drawing and process order of the design information.

In the modeling of the primary line, when the main line is combined, if the main lines cannot find a connection point and cannot be combined to a group, the line position may be fine-adjusted to combine the connected lines to a group.

In the modeling of the primary line, in the method of connecting the branch line to the main line as the target, a connection in which coordinates as a connection point are positioned may be calculated as the connector to be connected, and connected.

In the modeling of the primary line, connected primary lines may be combined to each other through a recursive call technique, and in the modeling of the utility line, the same type connected utility lines may be combined to each other through the recursive call technique.

In the modeling of the primary line, when the symbol is connected to the primary line and recognized as a separate line, the primary line may be connected.

In the modeling of the symbol, if the symbol is not located on the line and is not connected, the symbol may be modeled by correcting a position of the symbol to a position of the connected primary line.

In the modeling of the symbol, the symbol may be stored by associating attribute information of the symbol stored in the database to a symbol attribute of the intelligent P&ID.

The modeling of the utility line may further include: modeling the utility line, calculating a line and a connector to which the reducer or specbreak symbol is to be connected, connecting the reducer or specbreak symbol to the primary line, storing a newly generated pipe run ID, correcting an existing pipe run ID, and subsequently modeling the reducer or specbreak, if the symbol is a reducer or specbreak type.

In the modeling of the utility line, if the type of the connected utility line does not match the type of the symbol and cannot be connected, a report may be output by displaying corresponding information for a user.

In the modeling of the line number, the line number may be modeled to coordinates stored in the database.

In the modeling of the line number, text excluding the line number may be modeled to the coordinates stored in the database, and in the case of equipment in the text excluding the line number, the modeled text and an equipment symbol may be associated.

In the modeling of the line number and the text, if a value of the attribute information is not an item attribute of the intelligent P&ID, a report may be output by displaying corresponding information for the user.

If a drawing is automatically digitized through the above method, it is possible to automatically generate most work such as the generation of a drawing, material calculation, equipment list as basic design information, a line list, instrument list calculation, and the like by totaling design elements with high accuracy within a short time, productivity at work may be improved by excluding simple and repetitive work of calculating design elements manually by high-quality engineers.

In addition, if a drawing is automatically generated using data generated by the above method, design product compatibility may be maintained to improve design quality, as compared to the existing method of directly creating a drawing in the imaged P&ID. This solves problems such as wasting of time, missing items, misdescription, and the like of a plant engineering company, which may occur from a drawing drafted by checking one by one with naked eyes in the related art.

In addition, when accuracy is verified after 3D modeling, it may be compared with stored data, thereby verifying accuracy of the created drawing quickly and accurately.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, a method of automatically recognizing and classifying design information in a P&ID drawing according to a first embodiment of the present disclosure and a method of automatically creating a drawing using design information according to a second embodiment of the present disclosure will be described in detail with reference to the accompanying drawings. However, the present disclosure may be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims. For reference, in the following description, when the detailed description of the relevant known function or configuration is determined to unnecessarily obscure the important point of the present disclosure, the detailed description will be omitted.

Figure 1:
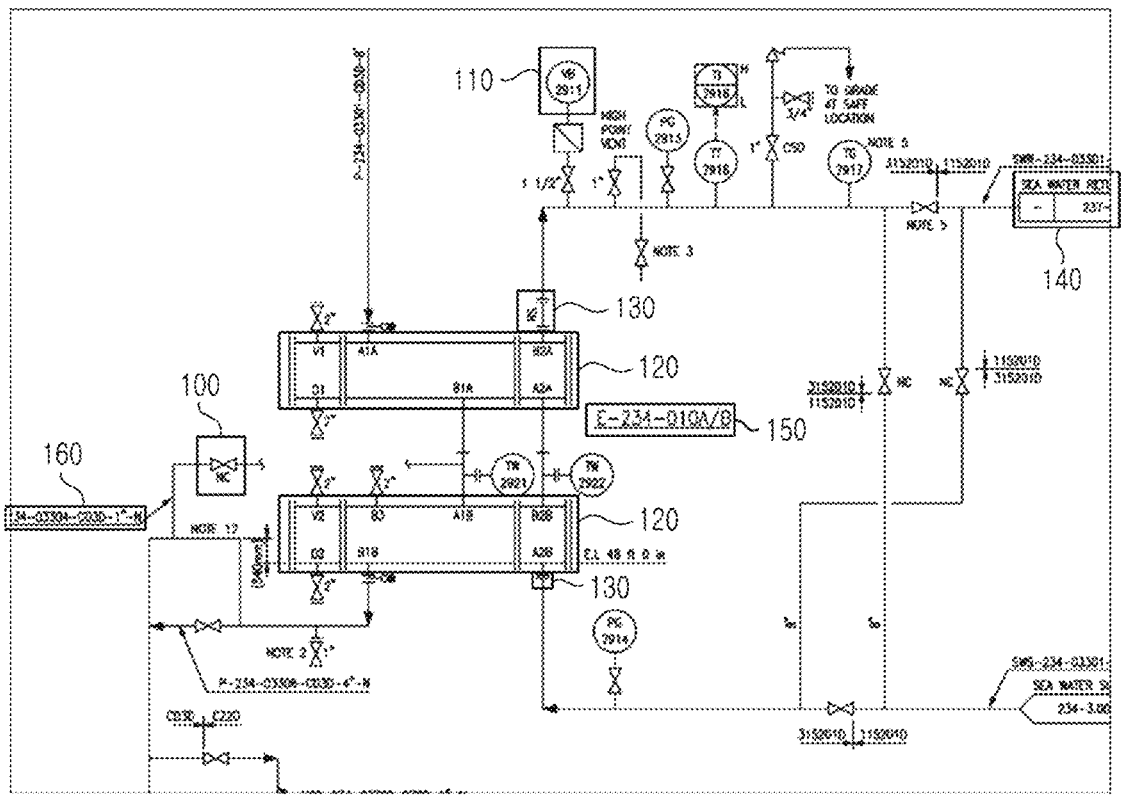
FIG. 1 is a view illustrating an imaged P&ID according to an embodiment of the present disclosure.

FIG. 1 is an embodiment of an imaged P&ID drawing including all of a symbol, line, and text. Here, the symbol is a schematized material excluding the line and the text in a drawing region and includes equipment, instrument, fittings, and operation page connection (OPC) or the like. FIG. 1 is composed of symbols such as valve 100, instrumentation 110, apparatus 120, nozzle 130 attached to apparatus, OPC 140, and the like. The OPC includes a symbol indicating another drawing connected to the drawing, and the number of the P&ID drawing to be connected is described in the OPC together with a direction indicator for a direction of the process. The line is a straight line connected to the symbols in FIG. 1 and includes a process line and a utility line. The process line is a piping line in which the main work of a plant is performed, and the utility line is a line for assisting an operation of the process line, such as an electric signal and a control line. The text is a part for describing the symbol and the line and includes text 150 for describing the equipment and a line number 160 for describing the line.

As described above, design engineers re-create the P&ID drawing in an image file, generally in a PDF file format as new P&ID drawings one by one, and thus, data between design products do not match and unnecessary time is required to set up front-end engineering design (FEED) data at an early stage. This causes a big problem in executing an overseas product.

In order to solve the problem and to collect the design elements within a short time and high accuracy in the initial FEED process to utilize the same in estimation work, to improve work productivity by excluding simple repetitive work of advanced engineers, and improving design quality, the present disclosure provides an automatic classification method.

Figure 2:
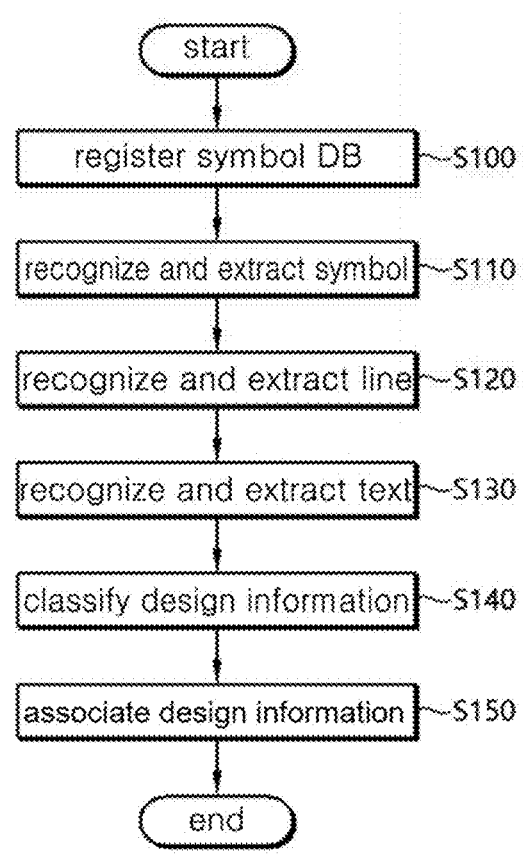
FIG. 2 is a flowchart illustrating a classification method according to a first embodiment of the present disclosure.

FIG. 2 is a flowchart of a method of automatically recognizing and classifying design information in an imaged P&ID drawing according to the present disclosure.

First, a symbol to be recognized (or as a recognition target) in a symbol prediction region is registered (S100). Here, the symbol prediction region is automatically extracted by a contour algorithm in the entire drawing. A symbol list is created according to a predefined classification system in the automatically extracted symbol region, based on which the symbol is registered to a database.

The contour algorithm for extracting the symbol prediction region extracts the symbol prediction region by connecting edge boundaries of portions having the same color or color intensity, and in the present disclosure, the symbol prediction region is extracted by distinguishing between a margin and a symbol region of the drawing. Registering the symbols to be recognized by the user one by one in the drawing is a time-consuming and inefficient operation and extracting the symbol prediction region is to reduce the required time.

Figure 3:
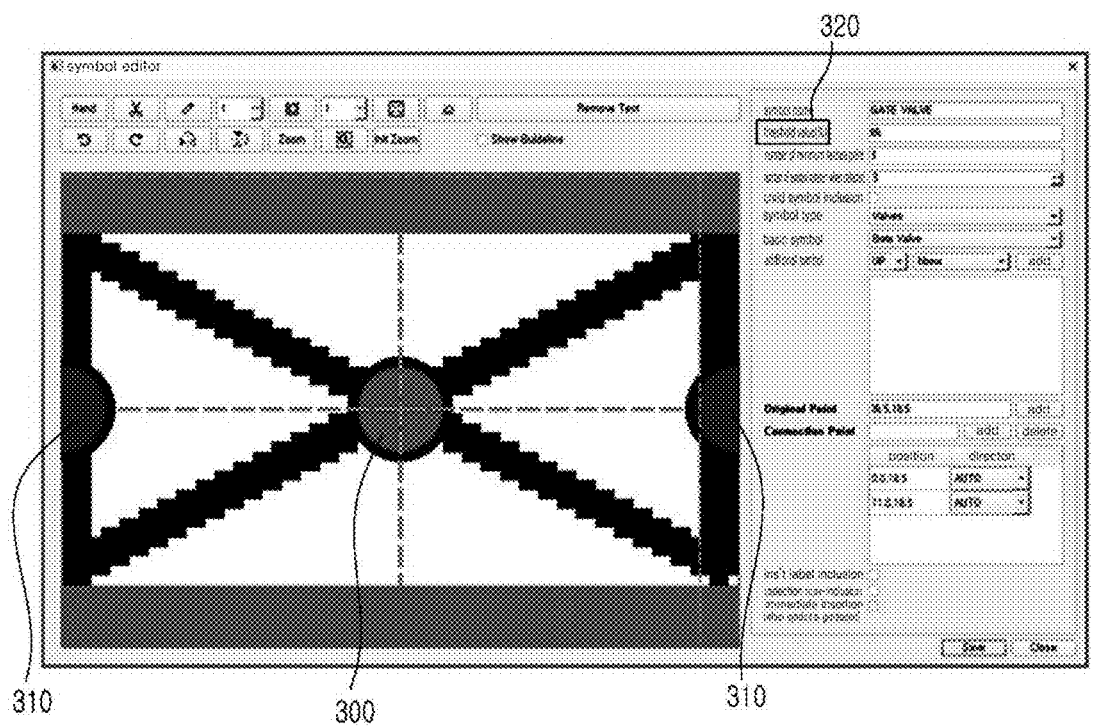
FIG. 3 is a diagram showing a step of setting an origin and a connection point in symbol registration according to the first embodiment of the present disclosure.

FIG. 3 is a view showing setting connection information such as an origin and a connection point of a symbol in a symbol when registering the symbol to a database. The symbol of the example is a valve symbol, a red dot 300 at the center is the origin, and the blue dots 310 on both sides are the connection points. The reason for setting the connection information for the symbol is that a starting point may be set when a line is recognized through the coordinates of the recognized connection points of the symbol, and the associating information may be used to automatically create a P&ID design drawing in the future.

In the step of registering the symbol, if the symbol is a set of a plurality of additional symbols, the additional symbols forming the set may be registered as one symbol. Therefore, features of the symbol are clear, increasing the recognition rate in recognizing the symbol, which is a subsequent process, and thus, the additional symbols forming a set are registered as one symbol, rather than registering a portion with a small size as one symbol.

It may be characterized in that the registration as a symbol including the additional symbols of the set. As a result, the characteristics of the symbol become clear and the recognition rate increases in recognizing a symbol, which is a later step. Therefore, the additional symbols constituting the set are registered as one symbol without registering a small portion as one symbol.

Next, a symbol is recognized and extracted from the imaged P&ID drawing based on the database in which the symbol is stored (S110). Here, the recognized symbol is removed from the imaged P&ID drawing. Through this, the time taken for recognizing a subsequent symbol may be reduced, the erroneous recognition rate may be reduced, and a case of mis-recognizing a symbol as a line when recognizing the line which is a subsequent step may be prevented.

As a method of recognizing a symbol, a method of recognizing a symbol one by one by rotating the drawing at 0, 90, 180, and 270 degrees may be used. If the symbol is recognized in four directions, even an unregistered symbol may be recognized in the database in which the symbol differs only in direction, thereby increasing the recognition rate. In addition, since the recognized symbol is removed, searching for symbols one by one does not require much time.

In the step of recognizing the symbol, a feature point of the recognized symbol may be compared with that of the stored symbol, and only when a conformity degree of the recognized symbol is higher than a threshold set by the user, the symbol may be recognized as the stored symbol (320). In this way, the user may arbitrarily set the threshold to adjust a recognition speed at a recognition rate.

In the symbol recognition step, the symbol in which the additional symbol is registered is first inspected, whereby the symbol is recognized and removed from the drawing. When the symbol including the additional symbol is preferentially recognized, a repetition recognition may be reduced to increase the recognition rate. Also, a basic symbol may be first recognized to prevent mis-recognition.

In the step of recognizing the symbol, the symbol may be recognized and extracted by expanding/reducing an image map of the symbol according to a size of the symbol and complexity of the drawing.

In the step of recognizing and extracting the symbol, the equipment amongst the symbols may be first inspected and a nozzle may be searched and extracted from the periphery of the equipment region. In general, since the nozzle is located near the equipment, the nozzle may be found near the equipment region. The symbol of the nozzle is small, so if it is recognized in the entire drawing region, there is a high probability of mis-recognition, but if the equipment amongst the symbols is first recognized and removed and the nozzle is subsequently searched and extracted, the recognition rate of the nozzle may be increased to improve the recognition rate of the entire symbol.

Figure 4:
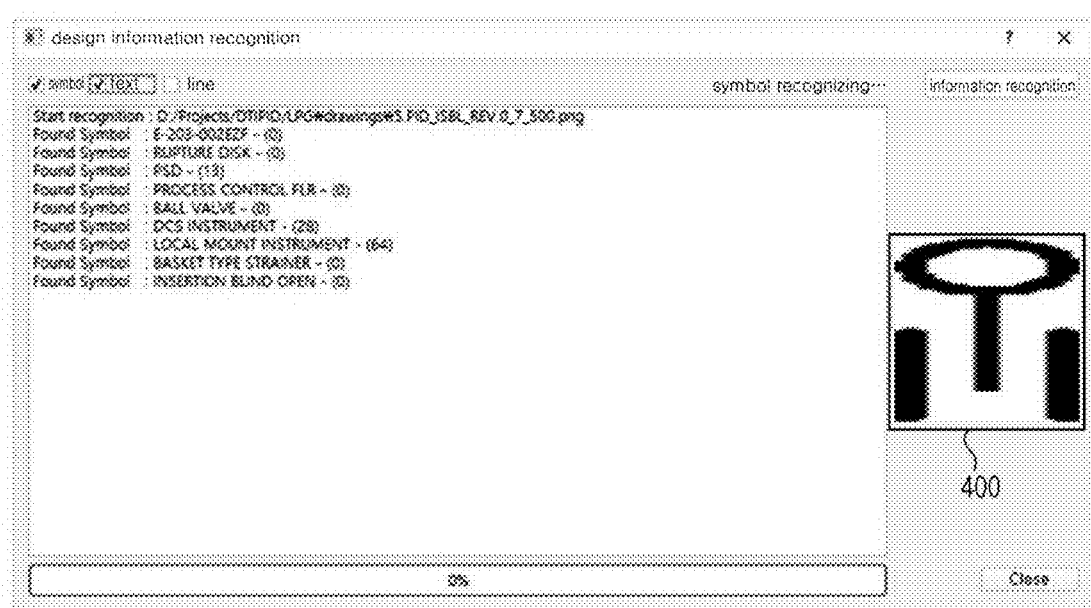
FIG. 4 is a view showing a step of recognizing a symbol of design information according to the first embodiment of the present disclosure.

FIG. 4 is a view showing comparing symbols one by one in a P&ID imaged with a png extension name at an initial step of recognizing a symbol. 13 PSD symbols, 28 DCS INSTRUMENTs, and 64 LOCAL MOUNT INSTRUMENTs were recognized and extracted, and currently, an insertion blind open symbol 400 shown on the right is being searched.

Figure 5:
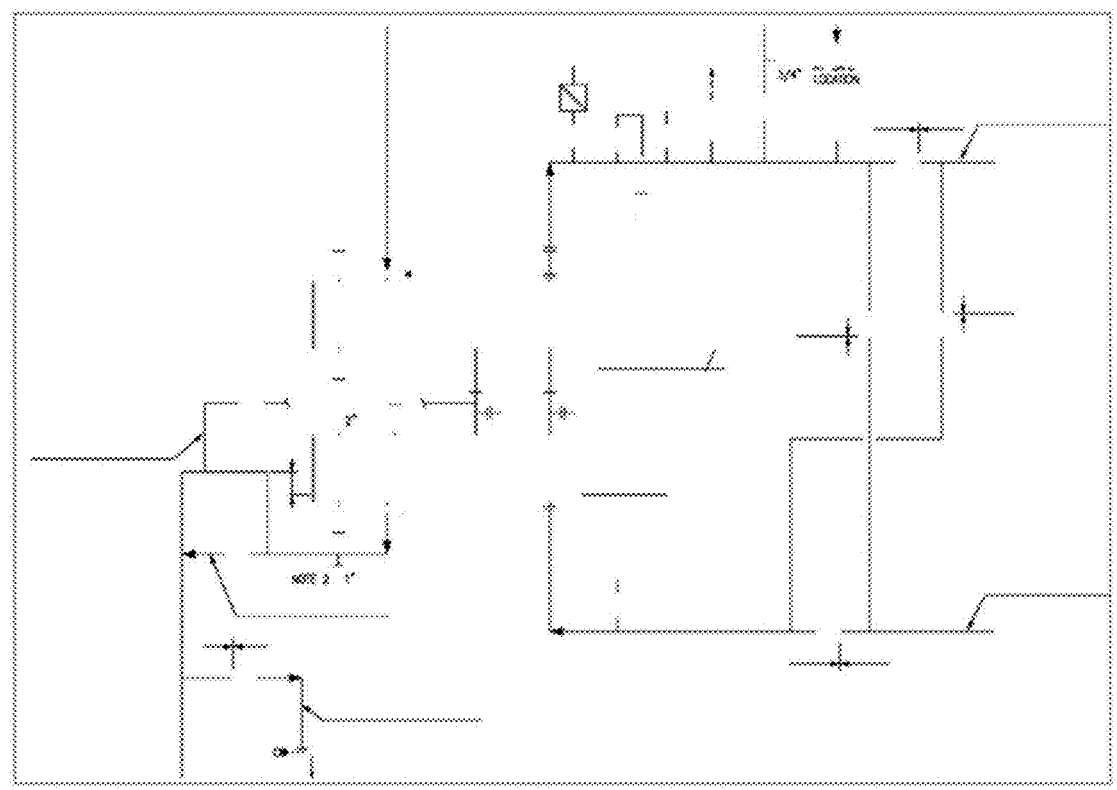
FIG. 5 is a view showing an embodiment after removing a symbol of an imaged P&ID drawing according to the first embodiment of the present disclosure.

FIG. 5 shows an embodiment after removing a symbol of an imaged P&ID drawing, in which it can be seen that the symbol is removed when compared with FIG. 2. Through this, the recognition speed in recognizing a symbol may be increased and a case where a symbol is mis-recognized as a line when a line is recognized may be prevented. In the imaged P&ID drawing, a line connected to a connection point of the removed symbol is recognized and extracted by using a sliding window method (S120). A small object such as a trim line is removed from the imaged drawing before line recognition.

Figure 6:
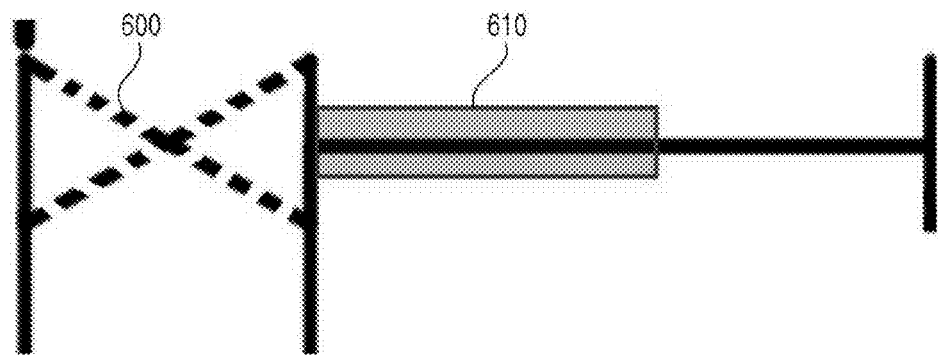
FIG. 6 is a view showing a step of recognizing a line of design information according to the first embodiment of the present disclosure.

FIG. 6 is a view illustrating the recognition of a line by the sliding window method. The sliding window method recognizes lines by calculating them in units of blobs rather than units of pixels, which reduces time required for recognition to be shorter than the method of recognition in units of pixels. A sliding window 610 is moved up and down/left and right at a connection point of the symbol based on the recognized symbol 600 to recognize a line, and if the line is not found while the sliding window 610 is moving to the left/right, the line is searched up and down at an end point. Even if a certain portion is occupied by the sliding window, it is recognized as a line, and thus, even if pixels are separated, it may be recognized as a line. Since the length of the sliding window may be arbitrarily adjusted by the user, the recognition accuracy and speed may be adjusted and used.

In extracting coordinates of the line, coordinates of the connection point of the symbol to which the line and the symbol are connected and coordinates of an end point of the line may not exactly match due to the thickness of the symbol and the line on the image. In this case, the line and symbol separated in units of pixels are fine-adjusted with the coordinates of the connection point of the symbol. This is necessary to accurately connect lines and symbols when generating a new P&ID using the database of the present disclosure. The corresponding fine-tuning may be applied in the same way between lines, so that when the center is not connected due to a thickness of a horizontal line/vertical line, the center is connected through the fine-tuning.

Next, a region where text is present is calculated by calculating an aspect ratio in the imaged P&ID drawing from which the symbol is removed, and text is recognized and extracted from the corresponding region (S230). In order to recognize the text, an existing text recognition program such as optical character reader (OCR) may be used. Since the principle of OCR implementation is well known, a detailed description thereof will be omitted. Of course, it is possible to use known text recognition methods other than OCR. Due to the characteristics of the P&ID drawing including a mixture of lines, symbols, and text, the text recognition rate is lower than that of a general document having only text. Therefore, there is a need for a method of extracting a region in which text exists by calculating a character aspect ratio in the drawing and recognizing only text in a corresponding region.

Figure 7:
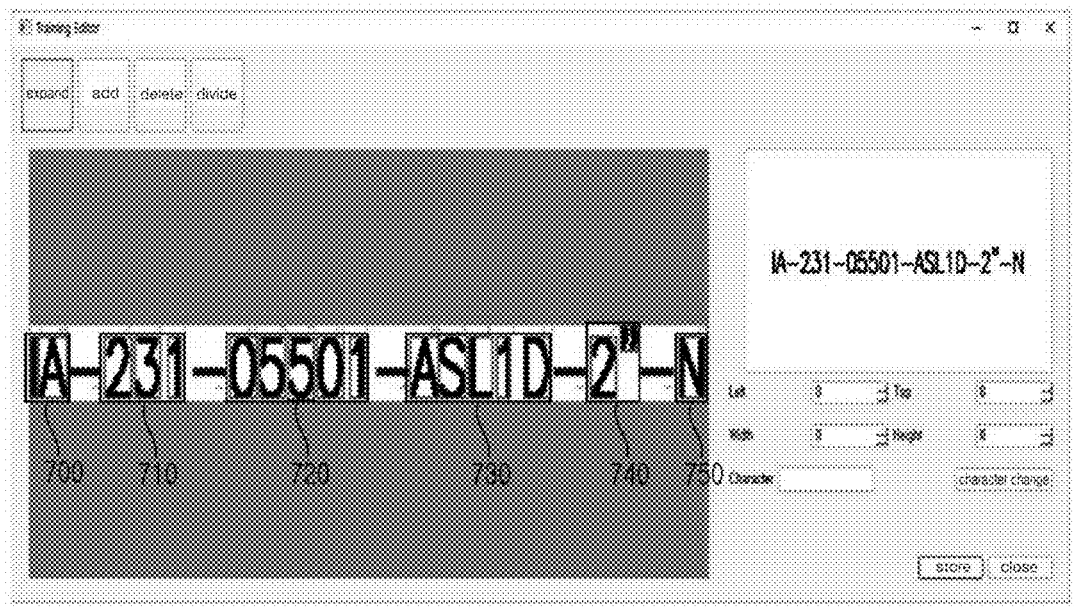
FIG. 7 is a view showing a text region extracted in a step of recognizing text of design information according to the first embodiment of the present disclosure.

FIG. 7 is a view illustrating a method of calculating the text region, and in the method of calculating the region. First an outer line is extracted, and a line and an instrument bubble are removed. Thereafter, if the recognized portion deviates a predetermined aspect ratio of a bounding box, the corresponding portion is removed, and if the recognized portion is within the range of the predetermined aspect ratio, the portion is left as a text region. The portion recognized as the text region is dilated to a predetermined threshold value and if a next recognized portion is determined as a text region, the recognized portion is left and, in this manner, a contour bounding box of the entire text region is generated to extract the entire text. The reason for setting and extracting the corresponding text region by a design information unit is to recognize the corresponding text region as a design information unit and to classify and associate the attribute information extracted from the text as a subsequent step.

When the region where the text exists is extracted by the above method, the text is recognized by applying the OCR to the text in the image of the extracted region. However, even an OCR having a highest level has a recognition rate which does not reach 100%, and thus misrecognition or unrecognition occurs, so it is necessary to increase the recognition rate by training the text. If the text is not recognized by the method of recognizing the text, the corresponding text image is first stored and a character is mapped in each image. As a method of mapping a character, a method of mapping a character most similar to the character of the image or a method of designating a corresponding character by the user may be used. Thereafter, training data is created using the mapping data, and the created training data is built as a database and applied to text recognition.

Next, text detected at a drawing region amongst the extracted texts is classified according to each attribute through a predefined attribute classification system (S140). The drawing region is a part consisting of a set of symbols and lines rather than a description part of the drawing, and the reason for distinguishing between the regions is because attributes to be classified may be different. In a case where text is detected from Note, Revision Data, Title Block, and Description region other than the drawing region, a region of each element to be recognized is set and a recognition element is determined by checking whether the detected text is included in the region is determined.

Properties of the text detected in the drawing region is divided into line number, size, tag number, instrument type, serial number, P&ID name, and the like. Corresponding attributes may be set arbitrarily according to the user. The line number follows an employer-specified form and is combined with size, fluid, serial number, insulation, and the like. Text forming a size includes a combination of numbers, special characters (/,"), and the like, the tag number includes a combination of alphabets, numbers and special characters (-, /,"), and instrument type is specified in a project.

FIG. 7 shows an embodiment of classifying attribute information by extracting a line number, in which attribute information such as fluid 700, unit 710, sequence 720, material 730, size 740, insulation 750, and the like are classified.

Next, attribute information that each symbol may have is predefined and attributes matching an attribute type of the recognized symbol and line are searched in the drawing and connected to the closest attribute (S150). By associating the attributes in this way, it is possible to recognize equipment and quantity required when calculating an estimate, and when a new P&ID is produced in the future, symbols and lines may be modeled and text describing the symbols and lines may be presented. By defining attribute information in advance, it is possible to prevent an error of associating unnecessary or incorrect attributes to symbols. The extracted symbols and lines are associated with the attributes of the extracted text on the basis of the closest distance, and when an extracted symbol is equipment, it is associated on the basis of equipment name recognized in the text. In the case of equipment, description present in a description region is used as a name of the equipment.

The symbol and line attributes may be divided into process/utility line, reducer, equipment, nozzle, instrument, and OPC. These attributes may be set arbitrarily according to the user. The process/utility line uses line number among the attributes classified in text string, the reducer uses main size x sub size, the equipment and nozzle use tag number, the instrument uses type, and the serial number and the OPC use P&ID number.

Figure 8:
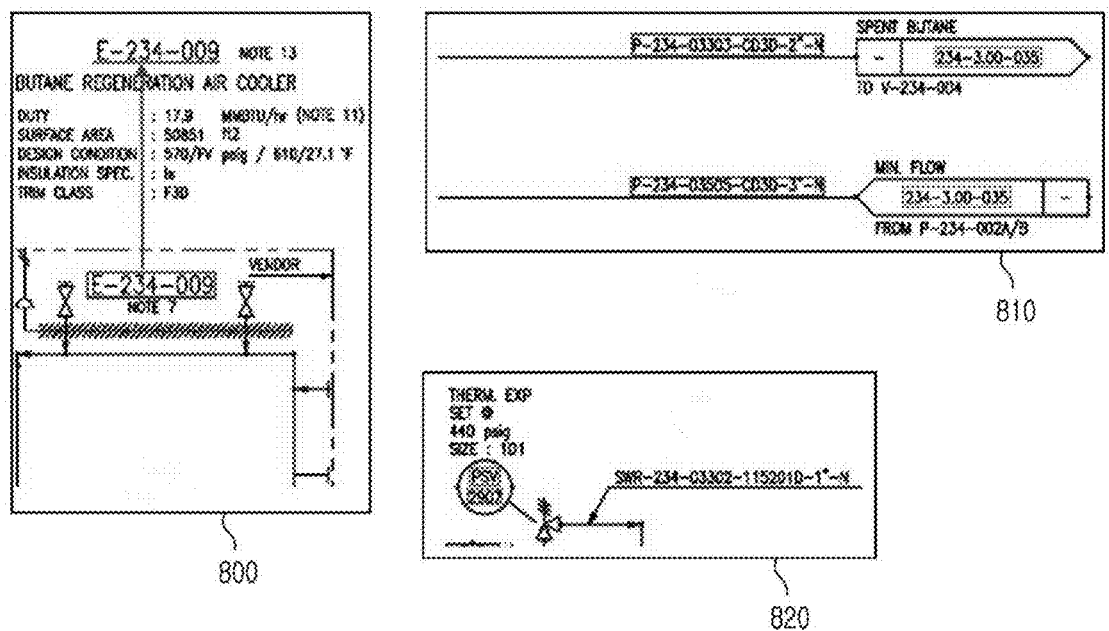
FIG. 8 is a view showing a step of associating an extracted symbol and line to design information according to the first embodiment of the present disclosure.

FIG. 8 shows an embodiment illustrating a step of associating an extracted symbol with the line, in which 800 indicates that "E-234-009" as an equipment amongst the symbols in a description region is associated with the corresponding equipment by an equipment name. 810 denotes that "P-234-03303-CD3D-2"-N" and "P-234-03305-CD3D-3"-N" closest to a line recognized as a line are associated by a line number, and 820 describes that "PSV 2907" as a symbol of a pressure safety valve is associated with the instrument type by a serial number.

Through the present disclosure, a bill of material (BOM) may be created based on the design information associated with the attribute information or a design estimation required in the FEED process may be automatically calculated using equipment, instrument, and the like. In addition, an intermediate file in an XML format may be generated by creating a topology based on integration of objects and utilized later to automatically create a P&ID.

Figure 9:
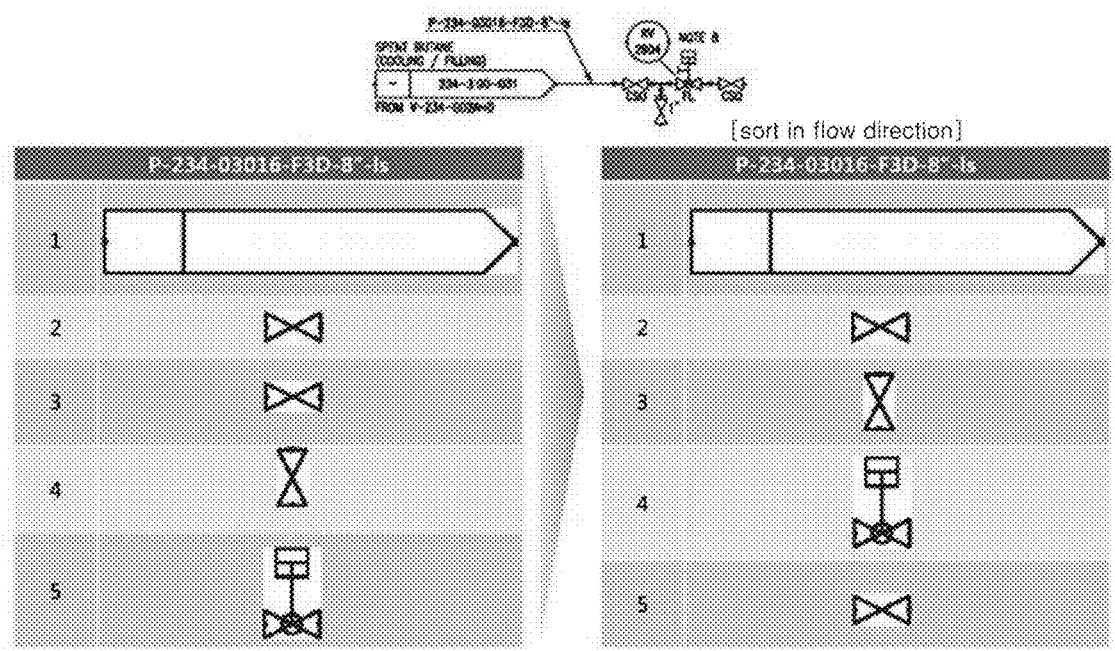
FIG. 9 is a view showing a step of rearrangement in order of flow mark according to the first embodiment of the present disclosure.

FIG. 9 shows that lines and symbols connected to the lines are connected through a recursive call technique after the step of associating design information, the connected symbols are re-arranged in from-to order of the line, and a topology is generated by integrating objects. First, an association relationship between recognition objects is defined as follows: the process/utility line includes a case of starting from equipment to end at equipment, a case of starting from line to end at equipment, and a case of starting from line to end at line. Other equipment has a nozzle dependent thereon and the P&ID drawing is associated with another P&ID.

The recursive call technique (recursive algorithm) refers to that a certain function that calls itself, and in the present disclosure, a certain symbol or line calls another connected symbol or line by using the stored connection information, and the process is continuously repeated to connect the line and the symbol connected to the line to rearrange them in from-to order.

According to the method of generating a topology, first, a line and each symbol connected to the line are connected and the connected symbols are re-arranged according to a flow mark of the line. If connection between the symbols is broken in the process of connecting the line and the symbols connected to the line, it is required to secure connectivity by adjusting coordinates on the basis of a central line. In the case of a method of sorting in from-to order according to the flow mark, line or objects connecting from-to, based on a line connected to from or to of a line list as a starting point, are searched and sorted in order. In FIG. 9, before sorting in the flow mark direction, symbols #2 and #3, which are the same, are continuously extracted in the process of recognizing the symbols, that is, the symbols are sorted out of order so a topology cannot be formed, and when the symbols are sorted in the flow mark direction, the symbols are sorted from the left to right. If a topology is not generated in from-to order, symbols should be modeled randomly only with coordinate points when a new P&ID is created based on the database generated by the method of the present invention, and in this case, a drawing different from the imaged P&ID drawing may be generated. Therefore, in order to automatically create a design drawing, which was manually performed when a new P&ID drawing was created, it is required to generate a topology.

When extracting the line, process line and utility line are not distinguished but the process line and utility line may be distinguished during the topology generation process. There may be an originally mis-described portion or erroneously recognized portion in distinguishing lines because it is most accurate to distinguish between objects connected to process line and utility line in the process of connecting objects. If the object to be connected is an instrument, the corresponding line is classified as a utility line, and otherwise, it is classified as process line.

In the process of connecting equipment, a nozzle may be attached to the equipment and included in a shape, so a nozzle overlapping the equipment shape is searched and connected. This is because the nozzle is generally in a small shape near the equipment.

A process of connecting to another P&ID using a P&ID number appearing in the OPC may be included. If the P&ID name appearing in the OPC and an actual file name are different, a setting for establishing a relationship between the two is necessary. In addition, since there may be several P&IDs associated to one P&ID, P&ID information in another page may be easily obtained by storing the P&ID information connected to the P&ID.

Figure 10:
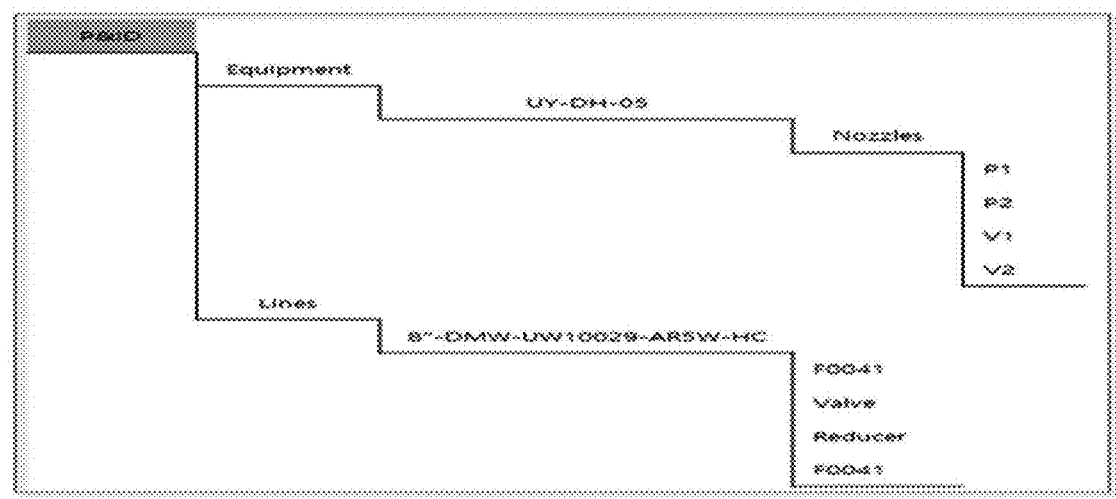
FIG. 10 is a view showing a hierarchy structure of a database created as an intermediate file according to the first embodiment of the present disclosure.

Next, the extracted design information and topology may be generated as an intermediate file in a compatible XML format. FIG. 10 is a view of a hierarchy structure of a topology constructed through association between objects created as intermediate files. In FIG. 10, for equipment, the equipment number is stored, and nozzles stored in order of "p1, p2, v1, and v2" are associated with the stored equipment numbers. In this way, it is illustrated that symbols are associated in order of "F0041, Valve, Reducer, Foo41" to a line with a line number "8"-DMW-UW10029-AR5W-HC".

The following is an automatic drawing creating method using a database including design information according to a second embodiment of the present disclosure. A design information database may be used through a method of automatically recognizing and classifying design information in a P&ID drawing according to the first embodiment of the present disclosure. However, the present disclosure is not limited thereto, and user may arbitrarily use design information extracted through another intelligent P&ID.

Hereinafter, a method of automatically creating a drawing using design information stored in a database through an SP P&ID (SmartPlant P&ID) among various intelligent P&IDs will be described.

Figure 11:
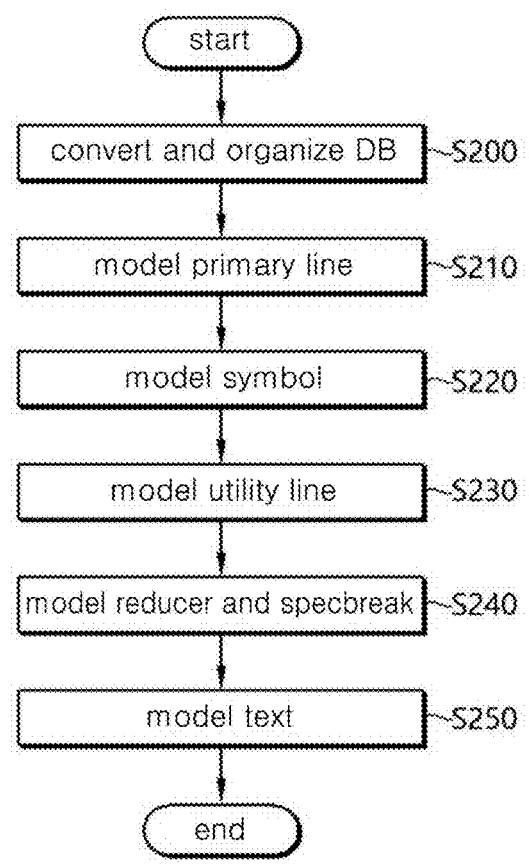
FIG. 11 is a flowchart illustrating a drawing creating method according to a second embodiment of the present disclosure.

FIG. 11 is a flowchart of a method of automatically creating a drawing using design information stored in a database according to the present disclosure.

First, design information stored in the database is mapped to predefined intelligent P&ID information and converted, and correlation and information of the converted data (S200). Since the design information stored in the database is a database selectively used by the user, the design information may be mapped and converted to conform to a concept defined by the user. Data is organized to convert symbol, line, line number and text information into intelligent P&ID items. If the design information stored in the database is design information of the line, a total of 11 types such as capillary, Connect To Process, Electric, Electric Binary, Guided Electromagnetic, Hydraulic, Mechanical, Pneumatic, Pneumatic Binary, Primary, Secondary, and Software are mapped to a predefined intelligent P&ID line type. After mapping the information, the correlation and attribute information of lines and symbols are converted and stored.

Figure 12:
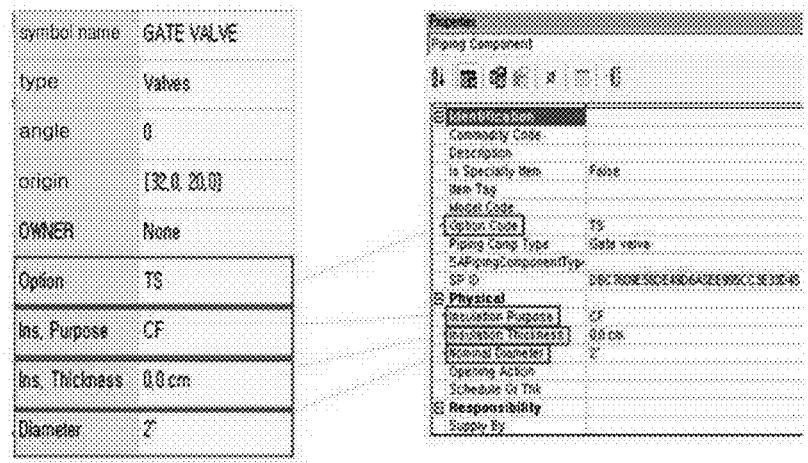
FIG. 12 is a view showing mapping and conversion of attribute information in a step of arranging a database according to the second embodiment of the present disclosure.

FIG. 12 is an embodiment of mapping attribute information of a gate valve among symbols, an attribute stored as "Option" in the database is mapped to "Option Code" according to the attribute of the intelligent P&ID. In the above manner, "Ins. Purpose" is mapped to "Insulation Purpose", "Ins. Thickness" is mapped to "Insulation Thickness", and "Diameter" is mapped to "Nominal Diameter". The association includes connection information in which the symbol and line are connected to a line and connection information between text and a symbol.

The database may include design information automatically recognized and classified in the imaged P&ID drawing and process sequence of the design information. Since the coordinates of the imaged P&ID drawing and the coordinate reference point and coordinates size of the intelligent P&ID are different, they are converted and stored through scale comparison and reference point symmetry.

Next, in the data mapped to the intelligent P&ID information to be converted, mutually connected lines, amongst lines which are primary in type, are combined to first model a main line, and a connector to which a branch line is connected is calculated to model the entire primary lines (S210).

When mutually connected lines are not fine-adjusted and combined as a group but modeled, an error occurs in the data, so lines are not parallel and much modeling time is consumed, and thus, line positions are fine-adjusted to integrally combine the mutually connected lines.

A recursive algorithm may be used as a method of combining the lines. The recursive algorithm means that a certain function calls itself, and in the present disclosure, a certain symbol or line calls another symbol or line connected using the stored connection information, and the process is continuously repeated to combine lines.

Figure 13:
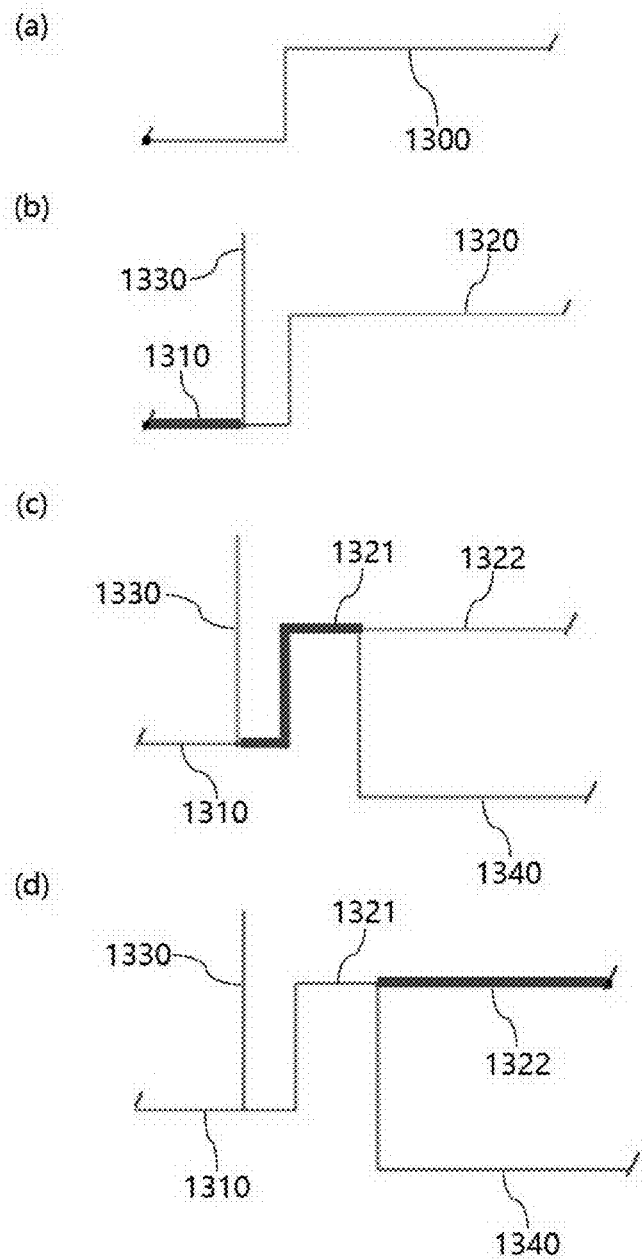
FIG. 13 is a view showing separation of a connector of a main line due to a branch line in modeling a primary line according to the second embodiment of the present disclosure.

FIG. 13 is a view showing that a connector of a main line is separated due to the branch line. The main line is a main process line of the process to be designed, and the branch line is a line attached to the main line. In FIG. 13, process (a) is a process of modeling the main line 1300, process (b) is a process of branching a first branch line 1330 from the main line, and processes (c) and (d) are processes of branching a second branch line 1340. The lines 1330 and 1340 separating the main lines become the branch lines. The connector is required for symbol and line connection in creating a drawing with SPP&ID among the intelligent P&ID. The connector is connection information necessary to find a line to which a symbol and a branch line are attached. When the branch line and the symbol are attached, a new connector is generated on a target line based on the branch line and the symbol. In process (b) of FIG. 13, the first branch line 1330 is connected using the connector information of the main line 1300 as an object, and two connectors 1310 and 1320 are generated after the connection. In process (c) of FIG. 13, the second branch line is connected to the right connector 1320 of the main line, and finally, two branch lines 1330 and 1340 and three connectors 1310, 1321, and 1322 are generated at one main line 1300.

Figure 14:
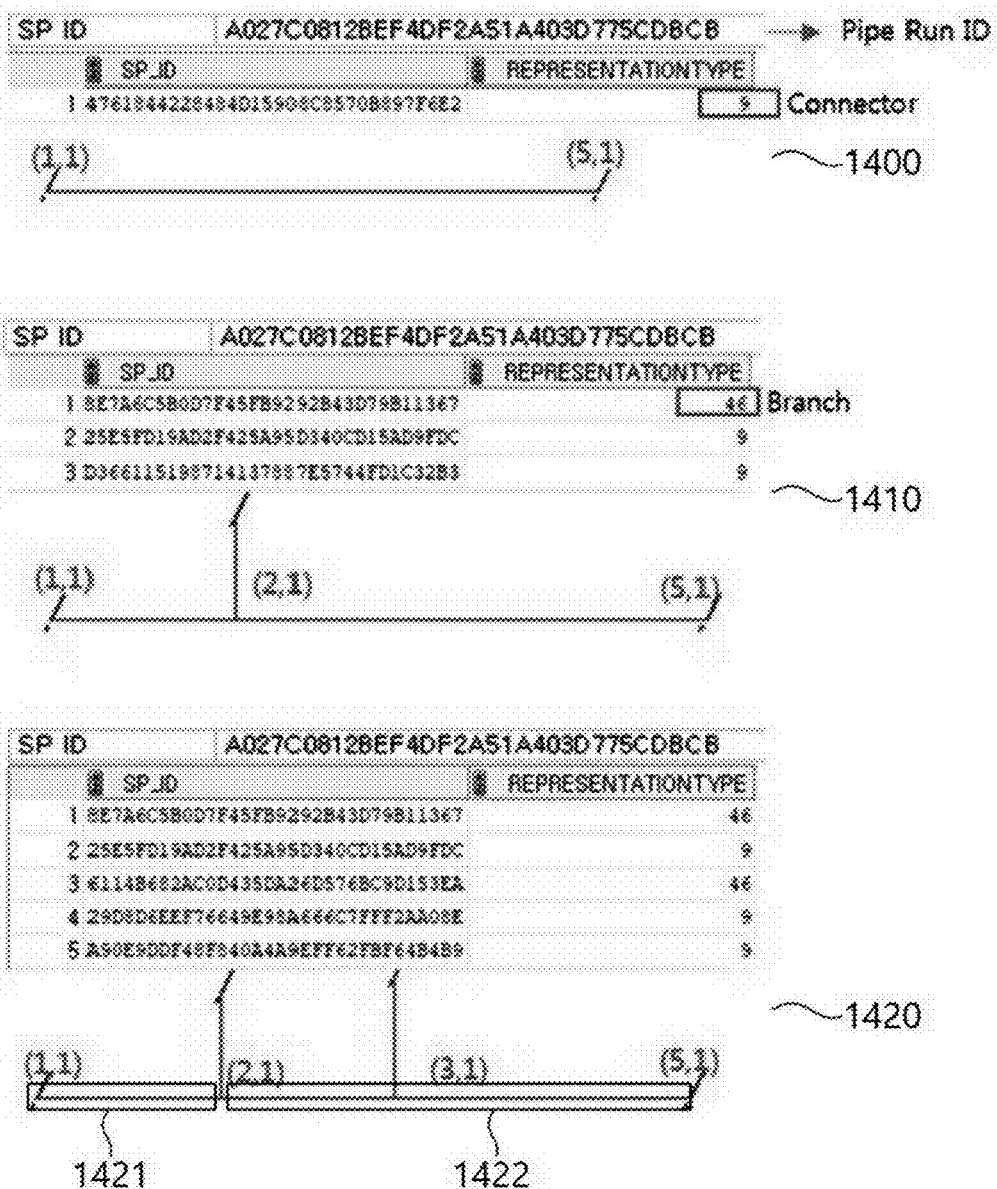
FIG. 14 is a view illustrating a connector calculation method connected to connect a branch line when a connector is separated in a step of modeling a primary line according to the second embodiment of the present disclosure.

FIG. 14 is a view showing a method of calculating a connector to connect a branch. Pipe Run ID is a unique ID of a line combined to the group and modeled, and when a corresponding Pipe Run ID is inquired, SP_ID and Representation Type may be checked. If Representation Type is "9", it is a branch, and if Representation Type is "46", it is a branch. 1400 is an embodiment in which there is only one main line, and a start point and an end point have coordinates of (1,1) and (5,1). In addition, since the symbol and the branch line are not yet connected, when the Pipe Run ID of the line is inquired, it may be confirmed that there is only one connector object. 1410 is one branch line which is connected, since there is one connector of 1400, the branch line is connected by inputting coordinates and a connector to which the branch line is connected as connection information. Here, after the branch line is generated, the coordinates of the branch line are stored. After connecting, it may be confirmed that one branch line object and two connector objects are generated by inquiring Pipe Run ID. When connecting a branch line to one of the two connectors as shown in 1420, it is necessary to find a connector to which the branch line is connected, but as shown in the embodiment of 1410, it is not possible to find a connector to which the branch line is to be connected only with the object information of the same Representation Type. In order to solve this problem, the present disclosure uses a method of calculating line point coordinates. Coordinates to which the branch line is to be connected are extracted from the database, a start point and an end point of each connector are searched using the coordinates stored when a pointer use branch line of a branch line of another line is connected, and a connector to be connected amongst the two connectors is calculated and combined. In the embodiment of FIG. 14, (3,1), which are coordinates to which the branch line is to be connected, is extracted, (1,1) and (2,1), which are a start point and an end point of the 1421 connector, and (2,1) and (5,1), which are a start point and an end point of the connector of 1422 are searched, and thereafter, when the coordinates are calculated, it can be recognized that the branch line is connected to the connector of 1422. After the branch line is connected, the coordinates of the connection point are stored and repeated to connect another branch line.

Figure 15:
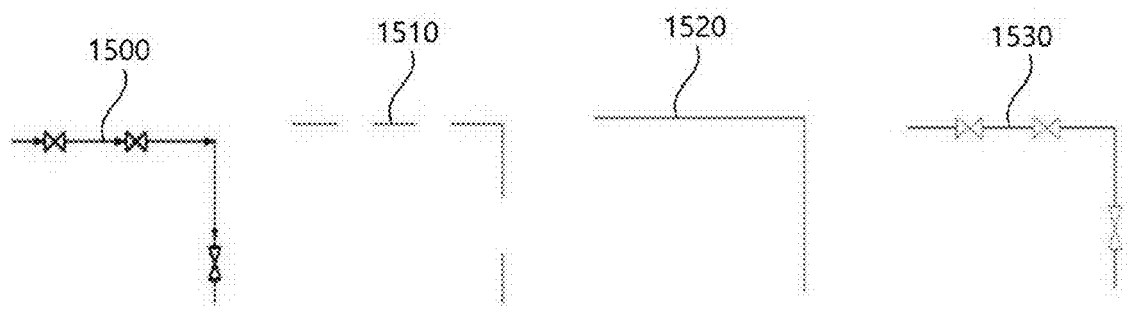
FIG. 15 is a view showing that line, which is not connected, is connected in a step of modeling a primary line according to the second embodiment of the present disclosure.

If a symbol is connected to the primary line and the line is recognized as a separate line, the line may be connected. The case where the symbol is connected to the primary line and the line is recognized as a separate line includes a case where a line is recognized as if it is not connected due to a region occupied by the symbol when the imaged drawing is recognized (1500) as shown in FIG. 15 and a case where lines are not combined to be connected to each other when the primary line is modeled due to unrecognition or misrecognition. If it is modeled as a line that is not connected (1510), it is possible to model the symbol in terms of the characteristics of the image in the step of modeling the symbol, which is a subsequent step in which different Pipe Run IDs are generated, but a position is not proper and connection to line is abnormally modeled. If the unconnected line is connected to an appropriate position to be modeled (1520) and assigned with one Pipe Run ID, a connector where the symbol is to be positioned may be searched in the step of modeling the symbol, which is a subsequent step (1530), and the reason for merging the lines is to draw correctly with speed enhancement and coordinate correction of image recognition. To this end, it is determined whether a symbol exists between lines that are not connected to each other through the line of the database and coordinates of the symbol, and if lines which are not connected with each other with the same symbol interposed therebetween exists, the both lines are connected and one Pipe Run ID may be assigned. This is one of the technical features of the present disclosure for efficiently modeling using intelligent P&ID.

Next, in the P&ID drawing in which the primary line is modeled, a line to which a symbol is connected and a connector are calculated, and the symbol is connected to the primary line to model a symbol (S220).

Figure 16:
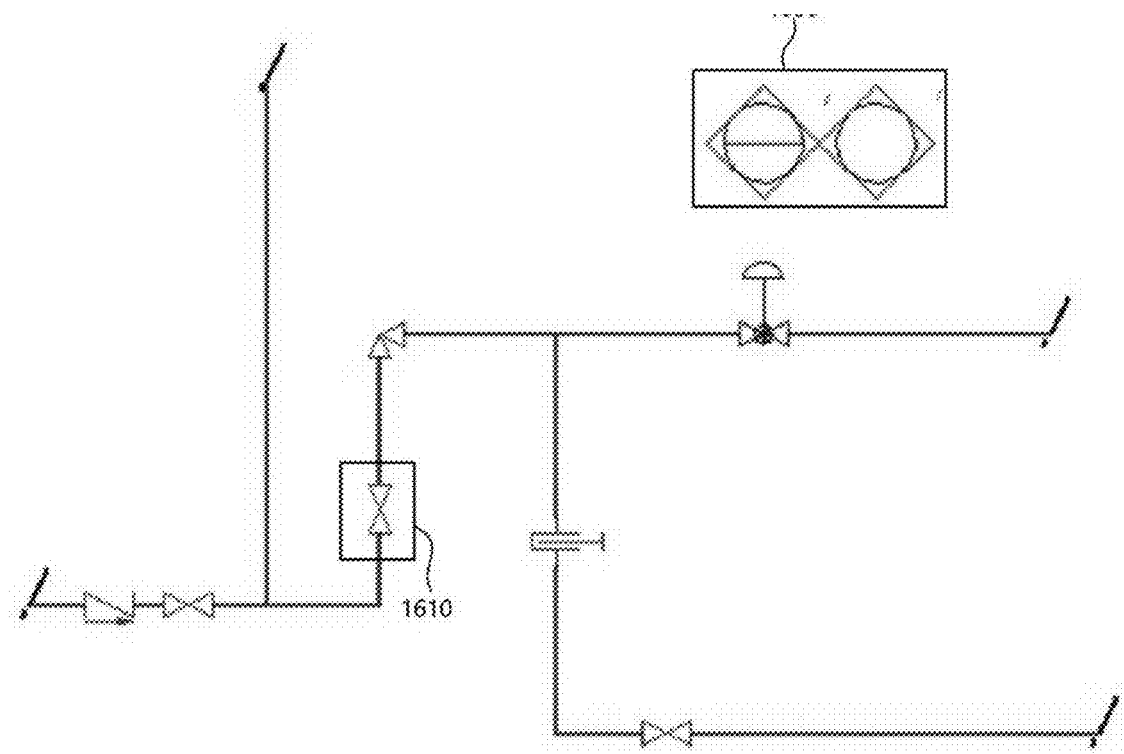
FIG. 16 is a view showing a step of modeling a symbol according to the second embodiment of the present disclosure.

FIG. 16 shows an embodiment in which the symbol is connected to the primary line, in which a line is connected to each connector of the symbol 1610, a connected connector is searched by calculating an association relationship with a unique ID (UID) of the line, and the symbol is modeled to the corresponding connector. The method of searching and modeling the connector is the same as the method when the primary line is modeled, and thus, a detailed method will be omitted. When a symbol is modeled, a type that may be connected to the primary line is determined, and a line and a symbol may be connected when their types are the same. Therefore, in the case of an instrument, not the primary type, since it may be connected to an electric line later, the symbol is modeled at a designated position although it is not connected to the primary line (1600).

In the step of modeling the symbol, if the symbol is not positioned on the line and is not connected, the symbol may be modeled by correcting the position of the symbol to the position of the primary line to be connected. The method of modeling the symbol uses a connector and coordinates, and if the coordinates of the symbol and the coordinates of the line to be connected are different, modeling is impossible or cannot be located at the correct coordinates. Accordingly, the symbol may be modeled by solving the problem by correcting the position of the symbol to the position of the primary line to be connected.

The attribute information of the symbol stored in the database may be stored in association with the symbol attribute of the intelligent P&ID. The attribute information of the symbol may be performed in a step after the symbol is modeled, and the symbol attribute of the intelligent P&ID and the attribute stored in the database preceded in the step of mapping and storing the database. Through the process of associating the attribute information of the symbol, the attribute of the symbol may appear on the drawing of the intelligent P&ID.

Next, the utility line is modeled by combining the same types of utility lines which can be connected to each other into groups in the P&ID drawing in which the symbol is modeled (S230). The method of modeling by connecting the utility lines is the same as the method of modeling the primary line, and thus, a detailed method is omitted. The process of modeling the utility line after the process of modeling the symbol is to model the utility line without an error because the utility line may be connected to the primary line through the symbol in the intelligent P&ID. Although the utility line is connected to the primary line through a symbol, if the utility line is called without the symbol, the utility line is not connected and a following step cannot be performed. Unless the utility line is connected to the primary line through a symbol, all lines including the utility line may be modeled in the primary line modeling process.

In the step of modeling the utility line, if the type of the connected utility line does not match the type of the symbol so the utility line cannot be connected, a report may be output.

Figure 17:
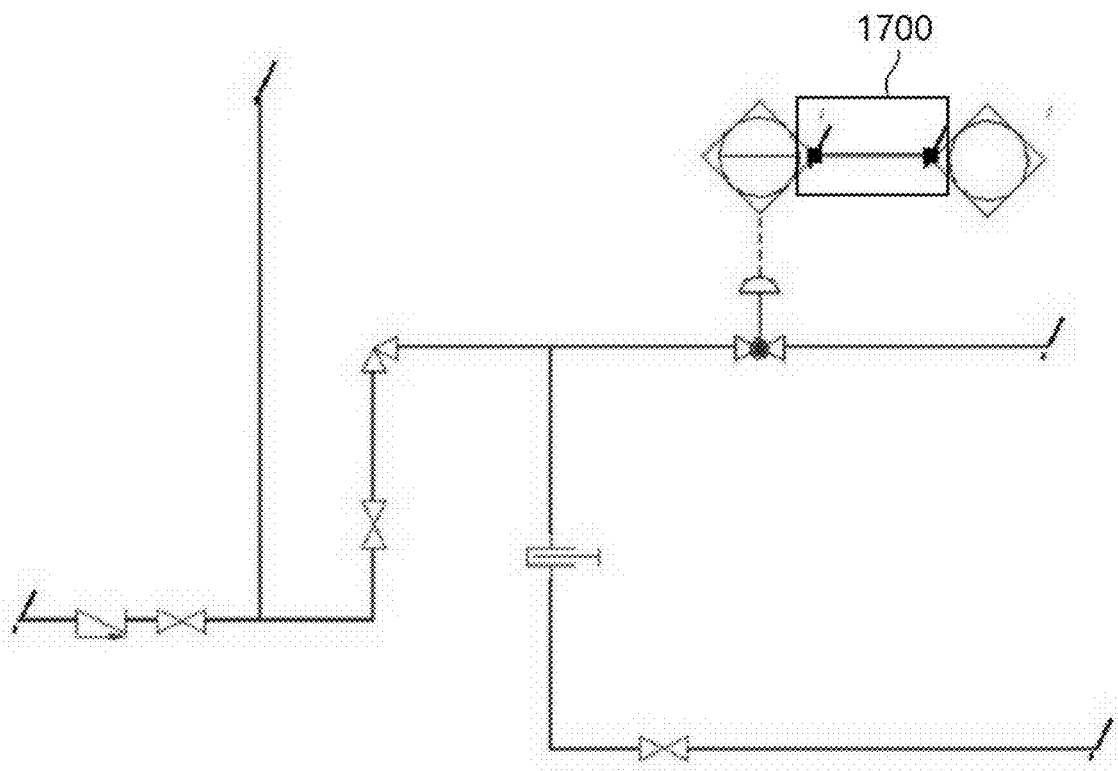
FIG. 17 is a view showing a step of modeling of a utility line according to the second embodiment of the present disclosure.

FIG. 17 is a view showing a process of modeling the utility line, in which 1700 indicates that a wrong utility line is connected to an electric type instrument, which outputs a report. Through the process of outputting the report, it can be found that a type of the utility line is erroneously registered in the stored database, which is helpful for compatibility check.

If the symbol is a reducer or specbreak type, a step of modeling the utility line, calculating a line and connector to which the symbol of the reducer or specbreak is to be connected, connecting the symbol of the reducer or specbreak to the primary line, storing a newly generated Pipe Run ID, and correcting an existing Pipe Run ID to model the reducer or specbreak may be further included (S240).

The reducer is changed in a size of a pipe and the specbreak is changed in a fluid type, the attributes of the line is changed before and after the reducer and the specbreak. In terms of the characteristics of the reducer and the specbreak type, the Pipe Run ID is changed before and after the corresponding symbol, making it difficult to calculate the connector of the symbol and line, and thus, the reducer and the specbreak may be modeled after all the symbols and lines are modeled.

Figure 18:
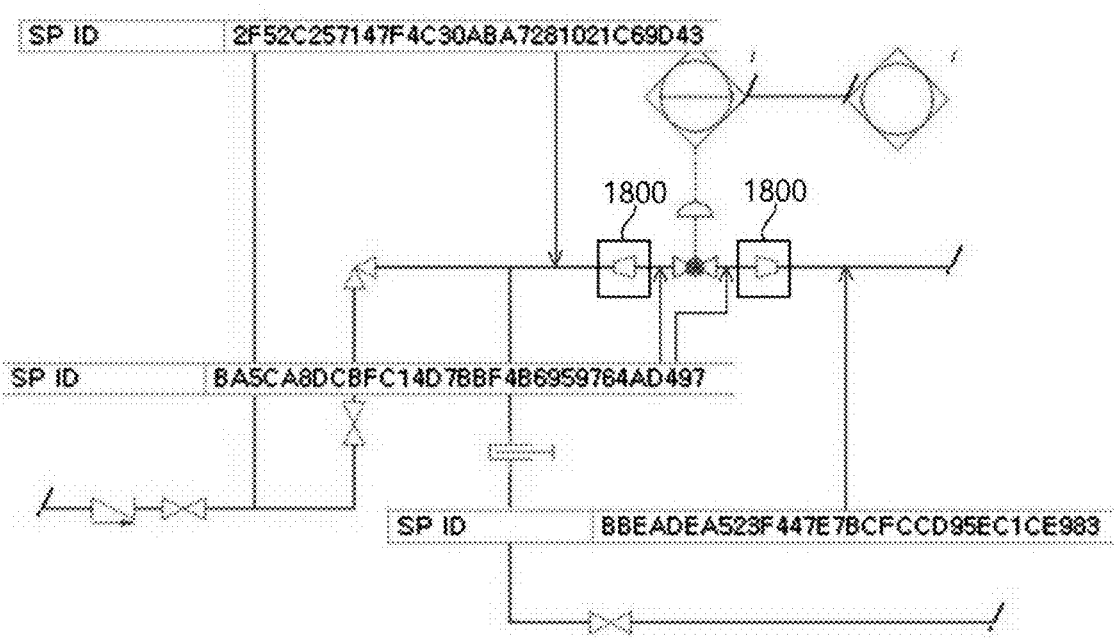
FIG. 18 is a view showing a step of modeling a reducer according to the second embodiment of the present disclosure.

FIG. 18 is a view showing that a reducer symbol is modeled (1800) and another Pipe Run ID is generated before and after the reducer symbol. After modeling, the Pipe Run ID is separated into two and in the process, the connector is also separated. Amongst the separated Pipe Run IDs, the existing Pipe Run ID is corrected and the new Pipe Run ID is stored to redefine the Pipe Run ID.

Next, in the intelligent P&ID drawing in which the utility line is modeled, the primary line and the utility line are modeled by associating attribute information of a line number at the closest position using coordinate information stored in the database (S250).

Figure 19:
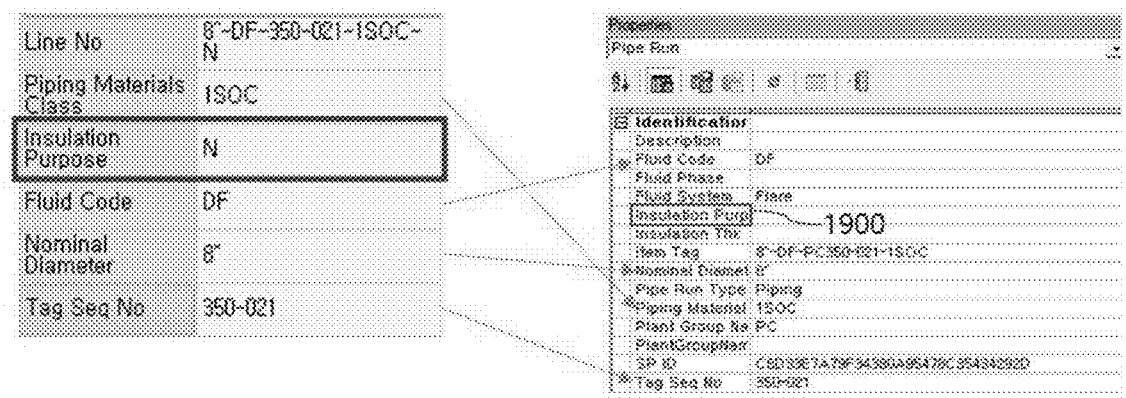
FIG. 19 is a view illustrating mapping attribute information in a step of modeling a line number according to the second embodiment of the present disclosure.

FIG. 19 shows mapping of attribute information of a line number stored in the database with attributes of Pipe Run. Piping materials class, fluid code, nominal diameter, and Tag Seq No, among the attribute information of the line number, are connected and stored, but the insulation purpose is not associated. In order to model the line number, data order of the line number is first checked and the matched line number attribute information is searched. Thereafter, a connector closest to a position where the line number is to be inserted is searched and line number attribute information corresponding to the line number is connected to the connector and modeled.

Text excluding the line number is modeled to the coordinates stored in the database, and in case of equipment in the text excluding the line number, the modeled text and the equipment symbol are associated.

In the step of modeling of the line number and the text, the text may be modeled to coordinates stored in the database. When the text is compared with a drawing as a target of design product compatibility comparison such as an imaged P&ID drawing, the text may be compared at the same position, which is thus, easy when compatibility of the design product is compared.

In addition, in the modeling of the line number and the text, if the value of the attribute information does not match the item attribute of the intelligent P&ID, a report may be output. In FIG. 19, Insulation Purpose is a case where the value of the database does not match the intelligent P&ID value. In this case, a value that may be input in the intelligent P&ID is determined and "N" of the example cannot be input, so a report is output to the user and is not input (1900). By outputting a report to the user, whether it is erroneously input to the database may be checked, and the attribute information may be verified later.

While embodiments have been shown and described above, it will be apparent to those skilled in the art that modifications and variations could be made without departing from the scope of the present disclosure as defined by the appended claims.

What is claimed is:

1. A method of automatically recognizing and classifying design information in an imaged piping and instrumentation diagram (P&ID) drawing, in an electronic device, the method comprising:
   extracting a symbol region from the imaged P&ID drawing, subsequently setting an origin point and a connection point of a symbol in the symbol region, and automatically registering the symbol to a database;
   recognizing and extracting the automatically registered symbol from the imaged P&ID drawing and removing the extracted symbol from the imaged P&ID drawing;
   recognizing and extracting a line using a sliding window method of calculating in a blob unit rather than a pixel unit in the imaged P&ID drawing;
   calculating an aspect ratio in the imaged P&ID drawing to calculate a text region in which text is present, and subsequently recognizing and extracting texts in the text region;
   detecting text among the extracted texts in a drawing region that consists of a set of symbols and lines, and classifying the detected text into each attribute; and
   associating the extracted symbol and line to an attribute of the text on the basis of a most adjacent distance,
   wherein associating the extracted symbol and line to the attribute of the text comprises:
   when the extracted symbol is equipment, associating the extracted symbol to the attribute on the basis of a name of the equipment recognized in the text.

2. The method of claim 1, wherein
   in the registering of the symbol, if the symbol forms a group of a plurality of additional symbols, the group of the plurality of additional symbols is registered as a single symbol, and
   in the recognizing and extracting of the symbol, the registered symbol including the group of the plurality of additional symbols is first inspected and recognized.

3. The method of claim 1, wherein
   in the recognizing and extracting of the symbol, the automatically registered symbol is rotated at 0, 90, 180, and 270 degrees and recognized and extracted from the imaged P&ID drawing one by one.

4. The method of claim 1, wherein
   in the recognizing and extracting of the symbol, the equipment among symbols is first inspected and a nozzle is searched and extracted in a periphery of an equipment region.

5. The method of claim 1, wherein
   in the recognizing and extracting of the symbol, the method compares feature points of the recognized symbol and a symbol registered in a process of the automatically registering the symbol, and only when a conformity degree of the recognized symbol is higher than a set threshold, the recognized symbol is recognized as the registered symbol.

6. The method of claim 1, wherein
in the recognizing and extracting of the line, if coordinates are different although a line is connected to the extracted symbol or if coordinates are different although a line and a line are connected, the line in the recognizing and extracting of the line is extracted by correcting the coordinates in a pixel unit.

7. The method of claim 1, wherein
in the recognizing and extracting of the text, the text is recognized by an optical character reader (OCR), and if the text is not accurately recognized, the OCR is trained by accurately mapping the non-recognized or erroneously recognized text.

8. The method of claim 1, wherein
the associating of the extracted symbol and line further comprises connecting a line and a symbol connected to the line through a recursive call technique and re-arranging the connected symbol in from-to order to generate topology.

9. The method of claim 8, wherein
the extracted symbol and line and the topology are generated as a compatible XML type file.

10. The method of claim 8, wherein
in the generating of the topology, if an object connected to the line is an instrument among the symbols, the object is classified as a utility line, and the object is classified as a process line in an otherwise case.

11. The method of claim 8, wherein
in the generating of the topology, it is connected to a different P&ID using a P&ID number shown in operating page connection (OPC) of the extracted text.

12. A method of automatically creating an intelligent piping and instrumentation diagram (P&ID) using design information stored in a database, in an electronic device, the method comprising:
mapping the design information stored in the database to the intelligent P&ID which is predefined, converting the mapped information, and storing an associating relationship and information of converted data;
combining primary process lines in a design target process to each other to connect a main line in modeling to a primary line configuring the design target process in the converted data after being mapped to the intelligent P&ID, additionally connecting a branch line branched from the main line, wherein the branch line is connected using a connector of the main line, which is a target, as association information;
calculating a line and a connector to which a symbol is to be connected in the intelligent P&ID in which the primary line is modeled, and modeling the symbol connecting the symbol to the primary line;
modeling a utility line by combining same type utility lines which are connectable as a group in the intelligent P&ID; and
modeling the primary line and the utility line by associating attribute information of a line number present at a nearest position using coordinate information stored in the database in the intelligent P&ID.

13. The method of claim 12, wherein,
in the converting and storing, the database comprises the design information automatically recognized and classified in an imaged P&ID drawing and process order of the design information.

14. The method of claim 12, wherein,
in the modeling of the primary line, when the main line is combined, if main lines cannot find a connection point and cannot be combined into a group, a line position is fine-adjusted to combine connected lines to a group.

15. The method of claim 12, wherein,
in the modeling of the primary line, in the method of connecting the branch line to the main line as the target, a connection in which coordinates as a connection point are positioned is calculated as the connector to be connected, and connected.

16. The method of claim 12, wherein,
in the modeling of the primary line, connected primary lines are combined to each other through a recursive call technique, and
in the modeling of the utility line, the same type utility lines are combined to each other through the recursive call technique.

17. The method of claim 12, wherein,
in the modeling of the primary line, when the symbol is connected to the primary line and recognized as a separate line, the primary line is connected.

18. The method of claim 12, wherein,
in the modeling of the symbol, if the symbol is not located on the line and is not connected, the symbol is modeled by correcting a position of the symbol to a position of the connected primary line.

19. The method of claim 12, wherein,
in the modeling of the symbol, attribute information of the symbol stored in the database is stored in association with a symbol attribute of the intelligent P&ID.

20. The method of claim 12, wherein:
the modeling of the utility line further comprises modeling the utility line, calculating a line and a connector to which a reducer or specbreak symbol is to be connected, connecting the reducer or specbreak symbol to the primary line, storing a newly generated pipe run ID, correcting an existing pipe run ID, and subsequently modeling the reducer or specbreak symbol, if the symbol is a reducer or specbreak type.

21. The method of claim 12, wherein,
in the modeling of the utility line, if a type of a connected utility line does not match a type of the symbol and cannot be connected, a report is output by displaying corresponding information for a user.

22. The method of claim 12, wherein,
in modeling of the line number, the line number is modeled to coordinates stored in the database.

23. The method of claim 12, wherein,
in modeling of the line number, text excluding the line number is modeled to coordinates stored in the database, and in a case of equipment in the text excluding the line number, the modeled text and an equipment symbol are associated.

24. The method of claim 12, wherein
in modeling of the line number and the text, if a value of the attribute information is not an item attribute of the intelligent P&ID, a report is output by displaying corresponding information for a user.

* * * * *